March 25, 1952

A. KOLKO 2,590,547

ADJUSTABLE CRANK FOR AUTOMATICALLY
VARIABLE-SPEED TRANSMISSION GEARS

Filed May 29, 1947

Aron Kolko
Inventor

By
Attorney

Aron Kolko
Inventor

March 25, 1952
A. KOLKO
2,590,547
ADJUSTABLE CRANK FOR AUTOMATICALLY
VARIABLE-SPEED TRANSMISSION GEARS
Filed May 29, 1947
3 Sheets-Sheet 3
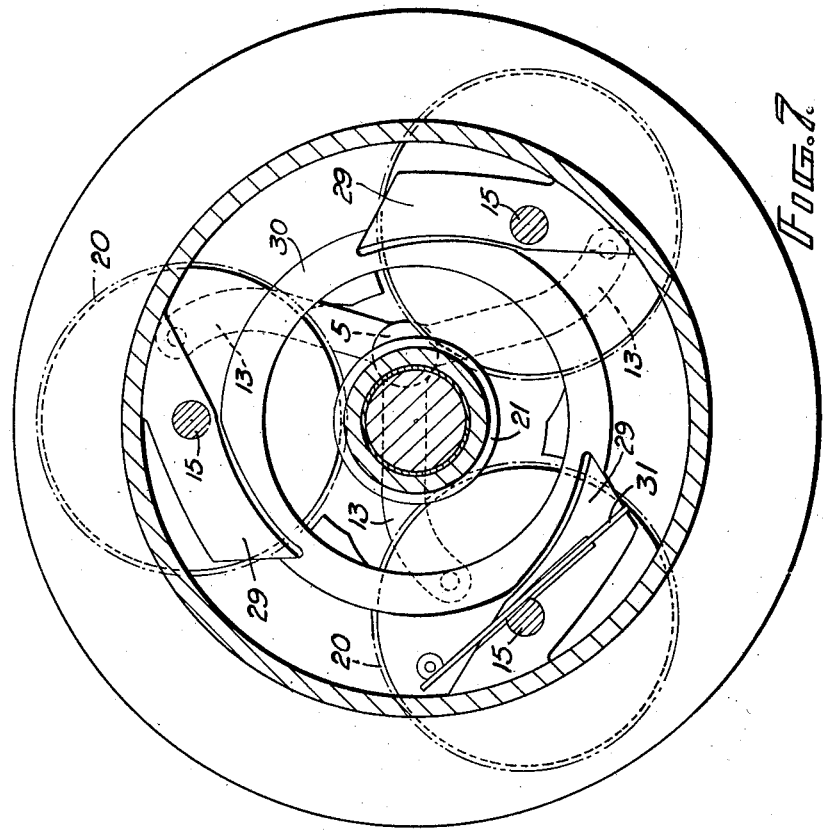
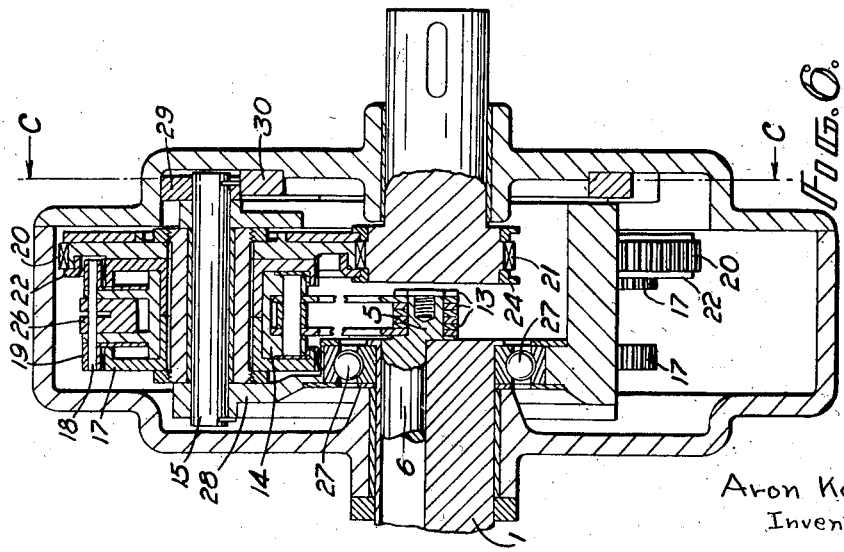
Aron Kolko
Inventor
By
Attorney Patented Mar. 25, 1952

2,590,547

UNITED STATES PATENT OFFICE 2,590,547

ADJUSTABLE CRANK FOR AUTOMATICALLY VARIABLE-SPEED TRANSMISSION GEARS

Aron Kolko, Seine, France

Application May 29, 1947, Serial No. 751,372
In France June 6, 1946

3 Claims. (Cl. 74—116)

This invention relates to automatically variable speed transmission gearing of the kind in which motion of a driving shaft is transmitted to a driven shaft by a plurality of connecting rods arranged side by side and having cranks displaced angularly in relation to each other in order to ensure continuity or smoothness of motion of the driven shaft despite the reciprocating motion of said connecting rods. By varying the stroke of the connecting rods of a transmission gear of this kind variation of the speed of the driven shaft can be obtained, as a function of the resistance which said shaft has to overcome, while the torque of the driving shaft remains constant. The variation in speed in fact results from variation in the degree of eccentricity of the crank pins of the cranks, with which one end of each of said connecting rods is coupled, which results in different reciprocating strokes of the opposite ends of said connecting rods, which are in turn connected with the driven shaft by a pawl and ratchet gear. The variation in the degree of eccentricity of the crank pins is effected automatically, according to the degree of resistance to the driven shaft, by a spring system which tends to maintain the eccentricity of said crank pins at its maximum value but which reacts to reduce the eccentricity of said crank pins as the resistance to the driven shaft increases; that is the variation of the ratio of driving couple to resistance couple acts in the opposite sense.

The object of the present invention is to provide an improved construction of transmission of this kind, in which the driving and driven shafts can be arranged coaxially and whereby a direct connection can be established between the two shafts.

The invention thus consists of an automatically variable speed transmission gear of the kind described wherein the driving and driven shafts are co-axial and the connecting rods extend substantially radially from the axis of said driving shaft and wherein said connecting rods are connected by ratchet mechanism to lay shafts disposed parallel to and radially around the axis of said driving and driven shaft and which are in turn connected direct with said driven shaft by toothed wheels or the like.

In order that the invention may be more clearly understood two embodiments thereof will now be described, by way of example, with reference to the accompanying drawings, wherein:

Figures 4 and 5 are details on an enlarged scale;

Figure 6 is a vertical section of another embodiment of transmission gear according to the invention; and Figure 7 is a section on the line C—C of Figure 6.

Figure 1:
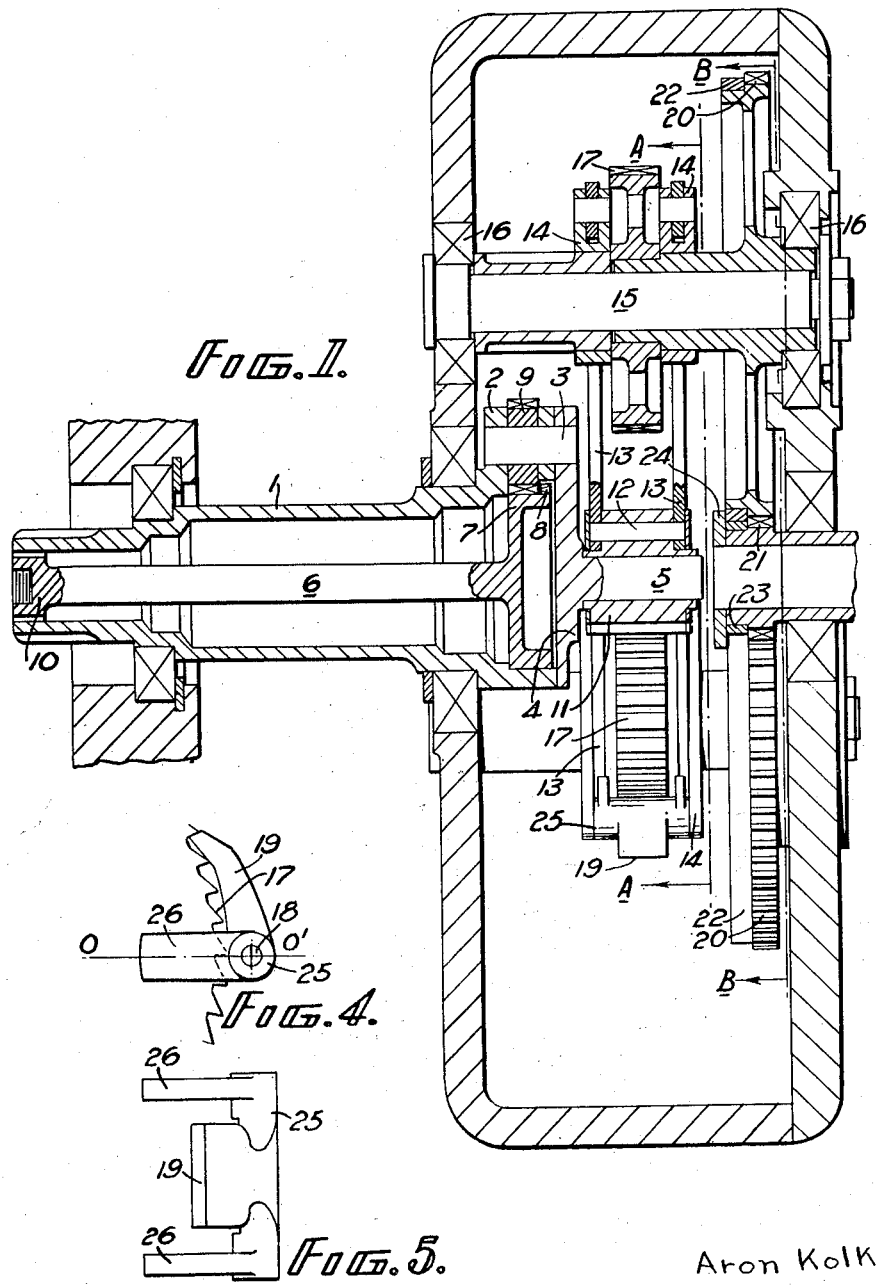
Figure 1 is a vertical section of a transmission gear according to the invention.
Figure 2:
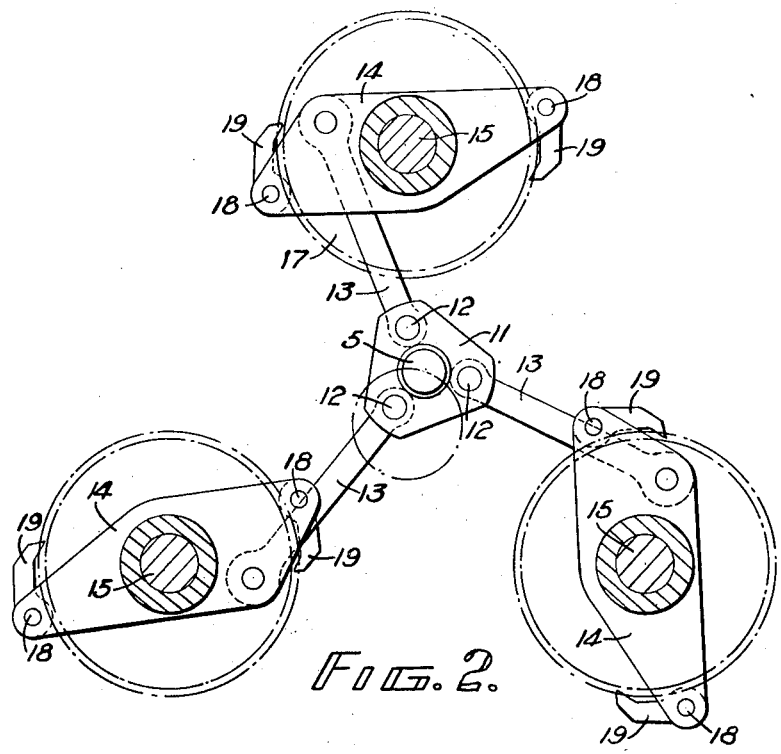
Figure 2 is a section on the line A—A of Figure 1.
Figure 3:
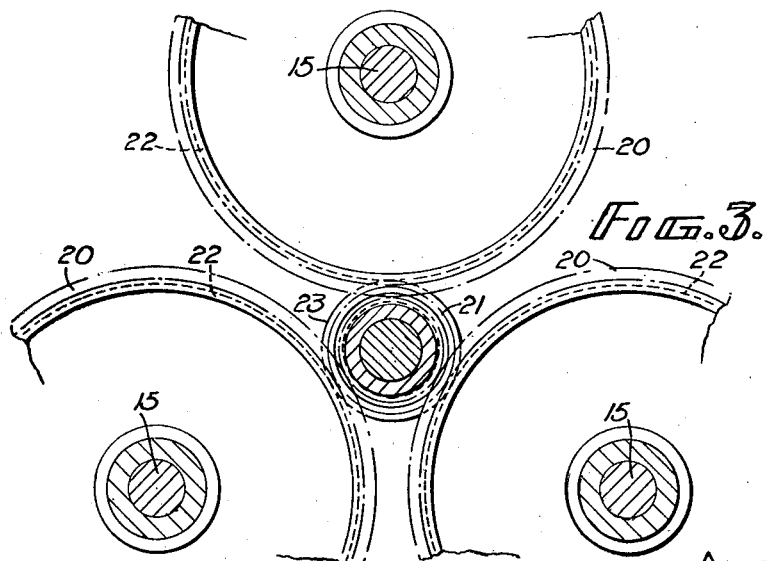
Figure 3 is a section on the line B—B of Figure 1.

Referring to Figures 1 and 2 of these drawings the mechanism comprises a hollow driving shaft 1 having at one end a crank arm 2 to which a second crank 4 is connected by a crank pin 3. The crank pin 3 is rotatably mounted in the crank arm 2 so that the second crank 4, with its crank pin 5, which is integral therewith, can be displaced angularly with respect to the axis of the crank pin 3, that is crank 4 is displaceable angularly with respect to the crank arm 2. The crank assembly 2, 4 rotates as a whole with said driving shaft 1 and around the axis thereof. When the axis of the crank 4 is in the diametrical plane which passes through the crank pin 3 the axis of the crank pin 5 will be coaxial with the driving shaft 1.

Coaxially mounted within the hollow driving shaft 1 is a torsion bar 6 provided at one end with a cylindrical head 7 having an external rack or toothed section 8 which meshes with a pinion 9 fast to the crank pin 3 of the crank arm 4. The opposite end of the torsion bar 6 is provided with an externally splined cylindrical head 10 and the inner cylindrical surface of the driving shaft is provided with longitudinal splines, the torsion bar being keyed or locked to the driving shaft by a key coacting with the splines on the torsion bar and driving shaft. The driving shaft is provided with a greater or smaller number of longitudinal splines than the torsion bar, the arrangement thus acts as a vernier for adjusting the torsion bar with respect to the driving shaft and locking it thereto under the desired amount of torque. The torsion bar is initially stressed so that it tends to maintain the crank pin 5 at its maximum eccentricity with respect to the axis of the driving shaft.

On the crank pin 5 is rotatably mounted a boss or hub 11 to which three sets of double connecting rods 13 are articulated by means of pivot pins 12. These connecting rods extend radially from the crank pin 5 and at their opposite ends are each pivotally connected to a cross-head 14. Each cross-head comprises a pair of parallel plates and is rotatably mounted on separate lay shafts 15 arranged parallel to and concentrically around the axis of the driving shaft 1. Each of the three lay shafts 15 is rotatably mounted in bearings 16 and has securely mounted thereon a ratchet wheel 17, mounted between the two parallel plates of the cross-head 14, and a toothed wheel 20. At each end of the cross-heads 14 pawls or ratchets 19 are pivotally mounted at 18, the pivot pins being symmetrically arranged and the pawls or ratchets being adapted to engage the teeth of the respective ratchet wheels 17.

Rotation of the lay shafts 15, by means of the pawl and ratchet mechanism through the reciprocation of the connecting rods 13 by the driving shaft 1, causes rotation of the toothed wheel 20. The three wheels 20, corresponding to the three sets of connecting rods 13, mesh with pinions 21 fast on the driven shaft. Since the driving and driven shafts are coaxial means may be provided for automatically locking the transmission mechanism, comprising the connecting rods 13, the ratchet mechanism 19, 17 and wheels 20 (when the crank pin 5 is, for example, in the position of maximum eccentricity) whereby a direct drive between the driving and driven shafts is established, the transmission mechanism in such a case rotating as a whole without loss. Such an arrangement is illustrated in and will be more fully described hereinafter with reference to Figures 6 and 7.

In the construction according to Figures 1 and 2 the journalling of the end of the driven shaft on which the pinion 21 is mounted is effected by roller-like bearing consisting of rings 22 mounted on the toothed wheels 20 and having a diameter equal to the pitch circle of the gearing, the end of the driven shaft being supported between the three rings 22, all of which engage the periphery of a similar ring 23 mounted on the driven shaft itself. On the extremity of the driven shaft is an annulus 24 forming a radial flange which hold the rings 22, 23 in position and prevents longitudinal displacement of the wheels 20. The opposite end of the driven shaft may be mounted on a similar bearing or in any known manner.

A further important feature of the invention is the construction and arrangement of the pawls or ratchets 19 (see Figures 4 and 5). As shown the pawl or ratchet 19 is integral with a boss or hub 25 which also carries a counterweight or mass 26 which is parallel to the diametrical plane 0—0' passing through the axis of oscillation 18 when the pawl or ratchet is in engagement with the ratchet wheel 17. A light spring (not shown) is provided which tends to hold the pawl 19 in this position. This arrangement has the effect of so positioning the centre of gravity of the pawl assembly that the centrifugal force tends either to maintain the pawl 19 in position when in engagement with the teeth of said ratchet wheel 17 or out of position when disengaged therefrom. The centrifugal force is zero at the ends of the stroke while the tangential force is maximum and directed in one or other direction. Thus at the end of each stroke the pawl or ratchet 19 engages with or disengages from the teeth of the ratchet wheel 17 and is held by centrifugal force in whichever position it assumes.

In the construction shown in Figures 6 and 7 the transmission gear assembly can rotate as a whole about the axis of and in the same direction as the driving shaft but is prevented from rotating in the opposite sense by automatic locking means hereinafter described, the arrangement being such that if the speed of the driving shaft is greater than the speed of the driven shaft the locking mechanism comes into operation automatically and prevents the transmission gear assembly from rotating so that the transmission functions as a reduction gear but if, due to a change in speed ratio, the driven shaft rotates at the same speed and in the same sense as the driving shaft the locking mechanism is released and the transmission gear assembly rotates as a whole and thus results in a direct drive between the driving and driven shafts.

The gear according to Figures 6 and 7 comprises a driving shaft 1 mounted in bearings 27 in the gear casing and has turnably mounted therein a torsion bar 6 which is keyed to the driving shaft in the same or similar manner as in the embodiment shown in Figures 1 and 2. The inner end of the torsion bar 6 is provided with a crank pin 5 which can be displaced angularly with respect to the axis of the driving shaft 1 and is normally maintained in its position of maximum eccentricity by the torsion bar 6. As in the embodiment previously described three connecting rods 13 extend radially from the crank pin 5 and are each connected at their opposite or outer ends with a suitable pawl and ratchet mechanism 19, 17, by means of cross-heads 14, mounted on a lay shaft 15. As in the previously described embodiment the motion of the lay shafts is transmitted to the driven shaft by toothed wheels 20 also keyed to the lay shafts and meshing with a pinion 21 on the driven shaft. This construction is also provided with means 22, 24 for supporting the end of the driven shaft and preventing longitudinal displacement of the toothed wheel 20.

To enable the transmission mechanism to function as a reduction gear or a direct drive, according to the speed ratio of the driving and driven shafts, the transmission gear assembly is mounted on bearings 27 so as to be rotatable about the axes of the driving and driven shafts and is provided with locking means 29, 30. The lay shafts 15 are mounted in a cage or the like 28 which is rotatably mounted in the gear casing on the same bearings 27 as the driving shaft 1, thus said cage or the like 28 which carries all the gearing mechanism is rotatable as a whole about the axis of the driving and driven shafts. The locking means 29, 30 is so constructed and arranged as automatically to lock the gear assembly, and thus prevent its rotation, when the driving shaft rotates at a greater speed than the driven shaft so that the transmission functions as a reduction gear as described above, but said locking means is automatically released when the driven shaft rotates at the same speed as the driving shaft whereby a direct drive is established between the driving and driven shafts.

The locking means according to the embodiment shown comprises a pawl 29 pivotally mounted on each of the lay shafts 15 and adapted to coact with a rack or toothed annulus 30 secured to the gear casing. The said pawls are so constructed and so mounted that when the transmission gear rotates in a correct sense, that is when the driven shaft rotates in the same sense and at the same speed as the driving shaft the pawl 29 will be moved out of engagement with the rack 30 by centrifugal force (see dotted lines in Figure 7) thus permitting the gearing to rotate as a whole whereby a direct drive is established between the driving and driven shafts. When, the driving shaft rotates at a greater speed than the driven shaft, the reaction on the casing will be in the opposite sense to the rotation and this reaction will be transmitted to the pawls 29 which will move into engagement with the rack 30 under the action of, for example, light spring 31 and thus prevent rotation of the transmission gearing which will then act as a reduction gear.

The pawls 29 are shaped as shown in Figure 7 so that when they engage the teeth of the rack 30 at one end their opposite ends will press frictionally against the casing as shown in full lines.

The transmission gearing according to the invention, as will be understood, allows automatic control of the transmission ratio either as a function of the resistance couple or as a function of the speed of the driven shaft.

What I claim and desire to secure by Letters Patent is:

1. An adjustable crank for use in a variable speed transmission gear, the improvement comprising a hollow driving shaft having a crank at the inner end thereof, a rotatable crank pin mounted in said crank, a pinion fixed to the crank pin, a second crank angularly adjustable with respect to the first named crank and having one end engaging the rotatable crank pin, a torsion bar mounted within and driven by the driving shaft, the torsion bar at its outer end having an adjustable spline connection with the driving shaft and at its inner end having a rack engageable with the crank pin pinion, and the torsion bar initially stressed to thereby tend to maintain the second named crank at its maximum eccentricity with respect to the driving shaft axis.

2. An adjustable crank for a variable speed transmission gear comprising in combination, a hollow driving shaft having a crank at the inner end thereof, a rotatable crank pin mounted in the crank, a second crank mounted on said crank pin and having a crank pin extending eccentrically of the axis of the driving shaft, a pinion fixed to the first named crank pin, a torsion bar mounted within the driving shaft and having its outer end fixed thereto, and a rack on the inner end of the torsion bar and engaged with the pinion, whereby the crank pin of the second crank is normally urged to its extreme eccentric position with respect to the driving shaft axis.

3. An adjustable crank for a variable speed transmission gear comprising a driving shaft having an axial bore adjacent one side thereof and spaced laterally from the center of the shaft, a torsion bar adjustably fixed within the bore and turning with the shaft, and an integral crank pin formed at the front end of the torsion bar and displaced angularly from the axis of the driving shaft.

ARON KOLKO.

REFERENCES CITED

The following references are of record in the file of this patent:

UNITED STATES PATENTS

| Number | Name | Date |
|---|---|---|
| 132,695 | Saladee | Oct. 29, 1872 |
| 220,375 | Hastie | Oct. 7, 1879 |
| 312,709 | Valin | Feb. 24, 1885 |
| 697,342 | Horton | Apr. 8, 1902 |
| 1,213,190 | Hatton | Jan. 23, 1917 |
| 2,047,792 | McFarlane | July 14, 1936 |
| 2,295,337 | Derrah | Sept. 8, 1942 |

FOREIGN PATENTS

| Number | Country | Date |
|---|---|---|
| 193,645 | Great Britain | Mar. 1, 1923 |
| 386,138 | Great Britain | Jan. 12, 1933 |